(12) United States Patent
Sears et al.

(10) Patent No.: US 12,303,907 B2
(45) Date of Patent: May 20, 2025

(54) MODULAR INDUSTRIAL REDUCING MACHINE AND METHOD FOR DISASSEMBLING AN INDUSTRIAL REDUCING MACHINE

(71) Applicant: SSI Shredding Systems, Inc., Wilsonville, OR (US)

(72) Inventors: Todd Sears, Wilsonville, OR (US); Thomas Garnier, Wilsonville, OR (US); Michael Neunzert, Tigard, OR (US)

(73) Assignee: SSI Shredding Systems, Inc, Wilsonville, OR (US)

( * ) Notice: Subject to any disclaimer, the term of this patent is extended or adjusted under 35 U.S.C. 154(b) by 335 days.

(21) Appl. No.: 17/596,321

(22) PCT Filed: Jun. 9, 2020

(86) PCT No.: PCT/US2020/036830
§ 371 (c)(1),
(2) Date: Dec. 7, 2021

(87) PCT Pub. No.: WO2020/251950
PCT Pub. Date: Dec. 17, 2020

(65) Prior Publication Data
US 2022/0250082 A1 Aug. 11, 2022

Related U.S. Application Data

(60) Provisional application No. 62/859,622, filed on Jun. 10, 2019.

(51) Int. Cl.
*B02C 18/14* (2006.01)
*B02C 18/16* (2006.01)
(Continued)

(52) U.S. Cl.
CPC ............ *B02C 18/142* (2013.01); *B02C 18/24* (2013.01); *B02C 2018/162* (2013.01); *B02C 2018/188* (2013.01)

(58) Field of Classification Search
CPC ....... B02C 18/142; B02C 18/24; B02C 18/16; B02C 2018/162; B02C 2018/188; Y02W 30/58; B23P 19/04
See application file for complete search history.

(56) References Cited

U.S. PATENT DOCUMENTS 2,787,185 A * 4/1957 Rea ..................... F16B 19/1063
411/49
5,662,284 A * 9/1997 Koenig ................. B02C 18/142
241/236
(Continued)

FOREIGN PATENT DOCUMENTS

CN 104842045 A * 8/2015
EP 2394742 A1 * 12/2011 ......... B02C 18/0084
(Continued)

OTHER PUBLICATIONS

English translate (EP2394742A1), retrieved date Apr. 16, 2024.*
(Continued)

*Primary Examiner* — Mohammed S. Alawadi
(74) *Attorney, Agent, or Firm* — Lee & Hayes, P.C.

(57) ABSTRACT

A modular industrial reducing machine is provided. The reducing machine includes a removable cutting tray releasably coupled to a first and second axial endwalls in a base frame. Additionally, the removable cutting tray includes a plurality of non-rotating anvils designed to interact with a plurality of cutters during reducing operation to reduce material in the reducing compartment.

16 Claims, 10 Drawing Sheets

(51) Int. Cl.
*B02C 18/18* (2006.01)
*B02C 18/24* (2006.01)

(56) References Cited

U.S. PATENT DOCUMENTS

| | | | |
|---|---|---|---|
| 5,915,636 A * | 6/1999 | Caballero | B02C 19/0075 |
| | | | 241/73 |
| 11,406,986 B2 * | 8/2022 | Kjaersgaard | B02C 18/0084 |
| 2004/0159729 A1 * | 8/2004 | Strong | B02C 18/182 |
| | | | 241/236 |
| 2008/0283647 A1 | 11/2008 | Sotsky | |
| 2015/0060583 A1 | 3/2015 | Boehlefeld | |
| 2015/0217299 A1 | 8/2015 | Doppstadt et al. | |
| 2016/0089676 A1 * | 3/2016 | Tondelli | B02C 18/18 |
| | | | 241/243 |
| 2018/0126388 A1 * | 5/2018 | Neufeldt | B02C 23/00 |

FOREIGN PATENT DOCUMENTS

| | | |
|---|---|---|
| JP | 4381219 B2 | 12/2009 |
| JP | 2015199105 A | 11/2015 |
| JP | 2019-013900 A | 1/2019 |
| WO | 2019048530 A1 | 3/2019 |

OTHER PUBLICATIONS

English translate (CN104842045A), retrieved date Jul. 31, 2024.*
ISA Korean Intellectual Property Office, International Search Report and Written Opinion Issued in Application No. PCT/US2020/036830, Sep. 22, 2020, WIPO, 11 pages.
Japanese Office Action mailed Jan. 30, 2024 for Japanese Application No. 2021-573154, a foreign counterpart to U.S. Appl. No. 62/859,622, 6 pages.

* cited by examiner

MODULAR INDUSTRIAL REDUCING MACHINE AND METHOD FOR DISASSEMBLING AN INDUSTRIAL REDUCING MACHINE

CROSS REFERENCE TO RELATED APPLICATIONS

The present application is a U.S. National Stage of International Application No. PCT/US2020/036830, entitled "MODULAR INDUSTRIAL REDUCING MACHINE AND METHOD FOR DISASSEMBLING AN INDUSTRIAL REDUCING MACHINE" and filed on Jun. 9, 2020. International Application No. PCT/US2020/036830 claims priority to U.S. Provisional Application No. 62/859,622, entitled "MODULAR INDUSTRIAL REDUCING MACHINE AND METHOD FOR DISASSEMBLING AN INDUSTRIAL REDUCING MACHINE" and filed on Jun. 10, 2019. The entire contents of the above-listed applications are hereby incorporated by reference in their entirety for all purposes.

BACKGROUND

Industrial reducing and shredding machines are utilized in a wide array of industries such as consumer and industrial waste recycling, construction debris processing, hazardous waste processing, etc., to break-up a variety of materials into smaller constituents. Industrial reducers use cutting assemblies (e.g., cutters and non-rotating grates with anvils) to reduce the size of materials fed into the machine from hoppers. Generally, the reducing machines are a single structure including a cutting assembly and hopper along with a supportive frame. The reducer's drive assemblies (e.g., hydraulics, motors, bearings, etc.) designed to drive rotation of cutters, are routed through the unitary structure.

However, a wide variance exists in the expected lifespans of the machine components. To elaborate, certain high wear components such as the cutters and the anvil structures in the grate that together make up the cutting assembly, may become degraded prior to degradation of other lower wear components in the system such as the hopper, drive assembly, supportive frame etc. Previous systems, however, have permanently welded various components in the machine to one another. The permanent attachment between various components in the machine may, in certain circumstances, prevent repair of various parts in the reducer such as the cutting tray, rotating cutters, etc. In cases where machine repair is possible, the repair may be complex and costly. For instance, in previous reducers a worn out anvil structure may be repaired by cutting out the structure so that new structures can be welded into place. While modular industrial reducing machine designs have been attempted, they generally necessitate drive assembly deconstruction, further complicating repair procedures. The system's repair costs and outage duration are resultantly increased. This causes a drop in material throughput and therefore a drop in the machine's overall operational efficiency.

There is therefore a need for a modular industrial reducing machine that allows for replacement or repair of parts including the cutting assembly, without requiring extensive disassembly of the machine.

SUMMARY

To address at least some of the abovementioned problems a modular industrial reducing machine is provided that includes a hopper designed to guide material into a reducing compartment. The modular reducing machine further includes a base frame removably coupled to the hopper and including a first and a second sidewall and a first and a second axial endwall. The reducing machine further includes a drive assembly coupled to the first and second axial endwalls and a rotational shaft with a plurality of cutters. Additionally, the modular industrial reducing machine includes a removable cutting tray releasably coupled to the first and second axial endwalls and including a plurality of non-rotating anvils designed to interact with the plurality of cutters during machine operation to reduce material. The tray therefore functions as a modular unit designed for easy removal from the base frame. Consequently, the cutting tray can be efficiently removed for repair, machine reconfiguration, etc. As a result, the machine's longevity as well as adaptability is increased. Furthermore, by designing the machine for efficient deconstruction, the machine's downtime during repair is decreased and the machine's material throughput is correspondingly increased. For instance, in certain circumstances where the modular trays are used, a duration for the repair procedure may take one to two days as opposed to the week or more for conventional systems, assuming the conventional systems can be repaired. Incorporating a modular tray into the machine also allows for increased adaptability by the end user. For instance, a facility using the machine may swap out the cutting tray with another cutting tray designed with distinct shearing characteristics to meet reduction goals for new materials slated for processing, for example. The machine's modularity also allows for upstream adaptability in the manufacturing process, to reduce manufacturing costs. For instance, a number of different machines may be constructed using common manufacturing steps, to achieve production run cost savings. Subsequently, at a later manufacturing stage different cutting trays and/or rotational shafts may be placed in the machine to accommodate requirements of different facilities, for example.

In one example, the modular industrial reducing machine may include axially aligned bosses in the axial endwalls of the base frame mating with slots in the cutting tray. The slots and bosses function to align the cutting tray during assembly. This allows installation and disassembly efficiency to be further increased.

In another example, the reducing machine is designed to allow drive assembly components (e.g., bearings, hydraulic motors, and/or hydraulic conduits) to remain coupled to the base frame during removal of the cutting tray. In this way, the machine's repair procedure is further simplified, allowing for additional repair cost reductions.

To the accomplishment of the foregoing and related ends, certain illustrative aspects of the system are described herein in connection with the following description and the attached drawings. The features, functions and advantages that have been discussed can be achieved independently in various embodiments of the present disclosure or may be combined in yet other embodiments, further details of which can be seen with reference to the following description and drawings. This summary is provided to introduce a selection of concepts in a simplified form that are elaborated upon in the Detailed Description. This summary is not intended to identify key features or essential features of any subject matter described herein.

BRIEF DESCRIPTION OF THE DRAWINGS

FIGS. 1-10 are drawn approximately to scale. However, other relative dimensions may be used, in other embodiments.

DETAILED DESCRIPTION

Figure 1:
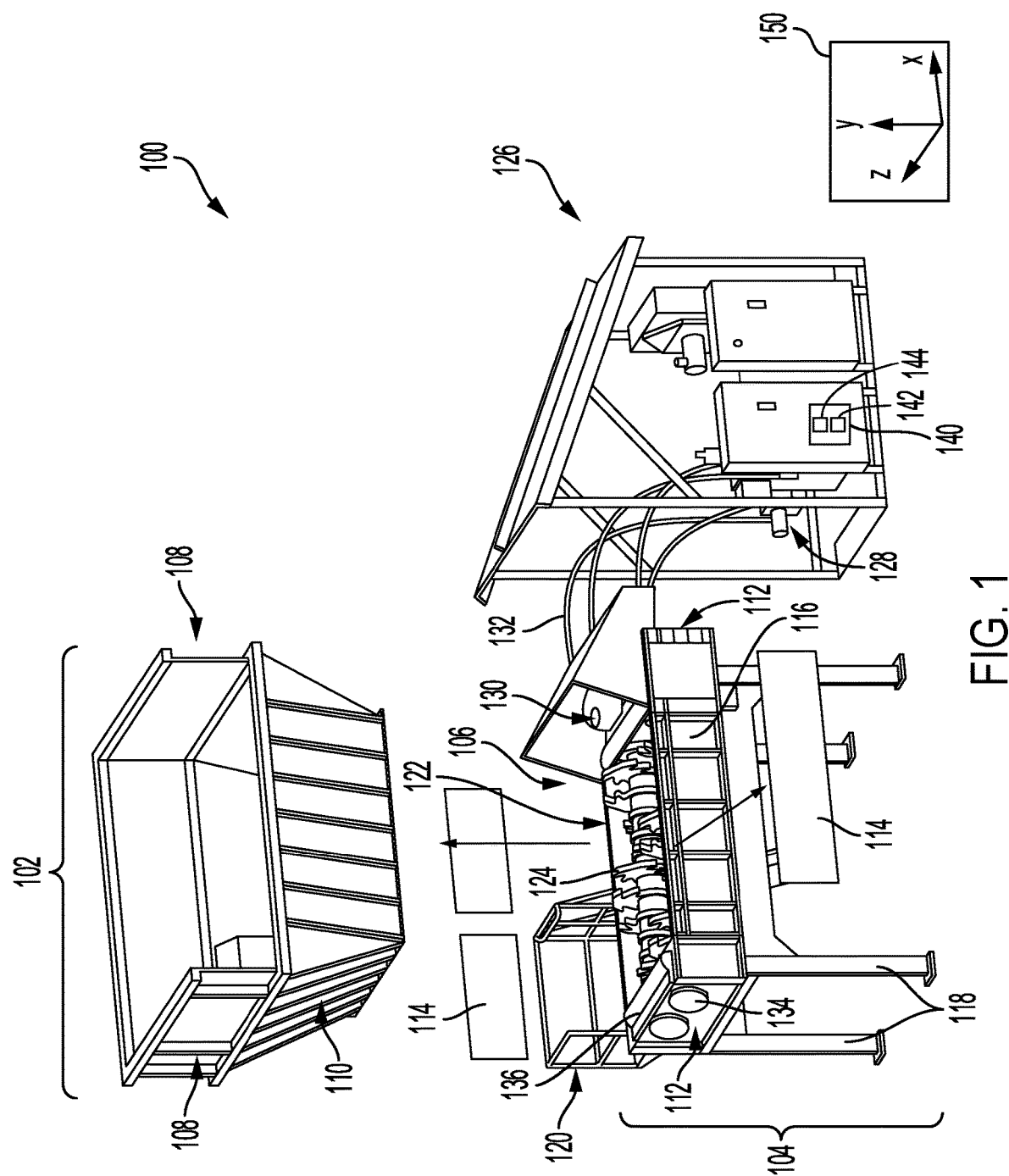
FIG. 1 illustrates a partially disassembled view of a first example of a modular industrial reducing machine.

Previous reducing machines have suffered from repair drawbacks due to the inadaptability of various components in the machine. For example, prior machines have welded hoppers to base structures as well as cutting trays to the base structures. As a result, these machines may not be repairable. In cases where repair is possible it may be convoluted and costly to disassemble and reassemble such welded structures. As such, a modular industrial reducing machine and method for efficiently disassembling and reassembling a modular industrial reducing machine are described herein which at least partially overcomes the inadaptability issues exhibited in previous reducers. The reducing machines described herein are therefore designed with modular components facilitating efficient component removal. The modular components are components expected to experience increased wear such as cutting trays, cutting shafts, etc. As such, in one example, the reducer may include a removable cutting tray releasably attached to axial drive ends of the reducer's base frame. Bolts or other suitable attachment devices provide the removable attachment between the axial drive ends and the cutting tray. The removable cutting tray can be efficiently removed due to the component's modular characteristics. In this way, the tray can be removed and subsequently serviced, repaired, and/or replaced, to increase the reducer's longevity. The introduction of the modular components in the reducer, therefore, allows downtime of the reducer during repair to be decreased, thereby increasing the machine's material throughput and ultimately driving down material processing costs.

When a removable cutting tray is employed in the reducing machine, the tray may be changed out by an end user to adapt to changes in material reduction goals or fine tune reduction operation. For instance, cutting trays with alternate numbers of cross-member and anvils or anvils having different profiles may be placed in the machine. As such, the machine may exhibit different reducing dynamics with regard to shearing, compression, etc. The rotational blade may also be swapped out in tandem with the cutting tray, for instance, to accommodate for the structural changes in the tray. The machine's adaptability may be consequently increased. Moreover, the reducer's modularity also enables the adaptability of the machine to be increased from a manufacturing perspective while at the same time reducing manufacturing costs, if desired. For instance, in the manufacturing process, in an initial stage, a number of different reducer models may be manufactured using similar steps, to leverage scaling cost reductions. However, at a later manufacturing stage, due to the machine's modularity, parts designed for different facilities, industries, etc., may be added to the machine to allow for machine customization to suit the reducer's intended operating environment. Providing a removable cutting tray in the reducer also increases installation efficiency of the reducer by allowing the reducer to be transported and installed using more manageable and space efficient components. This ultimately results in large gains in customer satisfaction and machine profitability by simplifying machine production, installation, repair, alteration, and servicing.

FIG. 1 shows a first embodiment of a modular industrial reducing machine 100 in a partially disassembled configuration. To elaborate, a hopper 102 is decoupled from a base frame 104. The hopper 102 is designed to guide materials into a reducing compartment 106. As such, the hopper 102 includes walls 108 for containing the materials slated for reduction. A section 110 of the hopper 102 may taper in a downward direction to allow the material to be efficiently fed into the reducing compartment 106. However, other hopper profiles may be used, in other examples.

The base frame 104 includes axial endwalls 112 and sidewalls 114 forming an enclosure and support structure for a removable cutting tray 116. The base frame 104 further includes legs 118 supporting machine components and scaffolding 120, allowing personnel to access various machine components in the illustrated embodiment. However, different configurations of the base frame 104 may also be used. For instance, the scaffolding and/or legs may be omitted from the machine in other embodiments. The layout of the base frame may be designed based on the expected end-use environment of the machine. For instance, consumer waste recycling plants may have different structural design objectives than hazardous waste processing plants. As such, the frame's layout may be tailored accordingly.

FIG. 1 also shows the sidewalls 114 of the base frame 104 removed to reveal underlying components such as the removable cutting tray 116. However, during disassembly the sidewalls may remain in place, in some examples, thereby simplifying the disassembly procedure.

The reducing machine 100 includes a plurality of rotational shafts 122 each including a plurality of cutters 124. The reducing machine 100 also comprises the removable cutting tray 116. During reducing operation, the cutters 124 rotationally interact with anvils in the removable cutting tray 116 to reduce the size of materials fed therethrough, from the hopper 102. The reducing machine 100, shown in FIG. 1, as well as the remainder of the machines described herein are designed to reduce a variety of material including but not limited to metals, polymeric materials, forestry products (e.g., lumber, structurally engineered lumber (wood composites, glue-lamination timber, etc.)), medical waste, electronic-waste, hazardous waste, etc. A container (not shown) positioned below the reducing interface formed between the cutters 124 and the cutting tray 116 may be provided to collect the processed materials, in some examples. However, in other examples, conveyors, conduits, etc., may be used to guide the reduced material to desired locations in a processing facility.

The removable cutting tray 116 is configured to be efficiently removed from the base frame 104 during machine disassembly. Specifically, attachment apparatuses coupling the axial endwalls 112 to the cutting tray 116 are provided to facilitate the efficient decoupling of the components. The efficient decoupling of the walls from the cutting tray allows higher wear components, such as the cutting tray 116 and/or rotational shafts 122, to be repaired or replaced when they become degraded or when they are approaching their expected lifespans. Consequently, higher wear sections of the machine can be changed out when nearing or exceeding their useful lifespans, allowing the machine's overall longevity to be increased. Furthermore, providing a modular cutting tray configured for efficient removal from the base frame, allows the machine's repair downtime to be reduced, if desired. As a result, the machine's throughput is increased. This allows for substantial gains in the machine's profitability. In one example, the cutting tray 116 may have its components welded to one another. It has been found through extensive testing that in certain scenarios, when components of the cutting tray are bolted or otherwise removably attached to one another, the tray may suffer from durability issues. For instance, the bolts coupling the tray together may degrade when the tray experience elevated loading during reduction operation. As such, in some examples, sections of the cutting tray such as the cross-members, tray housing, anvils, etc., may be welded to one another to increase the tray's structural integrity. Specifically, in one example, each of the cross-members, tray housing, and anvils may be welded to each other to form a stronger cutting tray. Welding the frame together allows for targeted structural reinforcement in selected machine components while leaving other components in the machine, which are less susceptible to degradation, with greater modularity.

The reducing machine 100 in FIG. 1 additionally includes a drive assembly 126 configured to impart rotational energy to the rotational shafts 122 with cutters 124. The drive assembly 126 may include a prime mover 128 (e.g., electric motor, internal combustion engine, combinations thereof, etc.) designed to pressurize hydraulic fluid. The pressurized hydraulic fluid is delivered to hydraulic motors 130 via hydraulic conduits 132 extending therebetween. However, other drive assembly configurations have been envisioned, such as a configuration where a prime mover directly delivers rotational energy to the shafts. The prime mover 128 is shown positioned in an enclosure spaced away from the base frame 104. In other embodiments, however, the prime mover and the base frame may be provided in a common structure.

The hydraulic motors 130 are designed to convert hydraulic pressure into rotational energy and deliver the rotational energy to the shafts 122. The hydraulic motors may include shafts, vanes, rotors, hydraulic chambers, and/or other suitable components for achieving the rotational energy transformation functionality. The reducing machine 100, shown in FIG. 1, specifically positions the hydraulic motors 130 on one of the axial endwalls 112 of the base frame 104. Machines with alternate hydraulic motor arrangements have been envisioned, such as the modular industrial reducing machine 300, shown in FIG. 3 and described in greater detail herein.

The drive assembly 126 also includes bearings 134 designed to facilitate rotation of the shafts 122. The bearings 134 may therefore include races, roller elements, etc., to allow for shaft rotation. The bearings 134 are mounted in the axial endwalls 112 of the base frame 104. Thus, in the illustrated example, each of the shafts 122 is rotationally supported by the bearings 134 at opposing axial ends of the shafts 122. However, drive assembly arrangements with alternate numbers of bearings may be used, in other examples. Furthermore, the hydraulic motors 130 may be designed to rotate the shafts in both a clockwise and a counterclockwise direction, in one example. In this way, shaft rotation may be reversed, if desired. Providing for shaft rotation reversal allows the machine to efficiently reduce materials that would otherwise bind in the machine. For instance, reversing the machine repositions materials in the cutter to allow the cutters and anvils to shear the materials with less force. However, in other examples, the hydraulic motors may be designed to only rotate the shafts 122 in one direction. In some aspects, the hydraulic motors may be programmable such that they may rotate in one or both directions depending on a variety of factors including but not limited to, the types of material being reduced. Components of the drive assembly 126 (e.g., prime mover 128, hydraulic motors 130, hydraulic conduits 132, and/or bearings 134) may remain in a substantially fixed position with regard to the base frame 104 when the shafts 122 and/or the cutting tray 116 is/are removed from the base frame during disassembly. In this way, the cutting tray and shafts may be efficiently removed without disassembling the drive assembly. For instance, the hydraulic motors 130 and the bearings 134 may remain attached to the axial endwalls 112 and/or the hydraulic conduits 132 may remain attached to the sidewalls 114, during removal of the shafts and tray from the base frame. In this way, shaft removal may more efficiently unfold during machine repair or servicing. However, during disassembly, in some examples, the axial endwalls 112 may be moved axially outward away from the tray to allow for removal of the cutting tray 116. The hydraulic conduits 132 may be sized to accommodate the separation between the axial endwalls 112 during disassembly.

The base frame 104 is shown including plates 136 extending across the axial endwalls 112 allowing for additional enclosure of the bearings 134. However, in other examples, the plates 136 may have a different profile or may not be included in the base frame 104.

The drive assembly 126 may include a controller 140 which is schematically represented in FIG. 1 and designed to carry out machine control schemes. The controller 140 may therefore include a processor 142 and memory 144 holding instructions executable via the processor. For instance, the controller may send commands to actuators in the drive assembly and receive signals from various components and sensors at various locations in the machine. For instance, torque sensors may be coupled to or integrated into the hydraulic motors 130 and/or rotational shafts 122. When the torque exceeds a threshold value the rotation of the shafts 122 may be reversed to assist in reducing operation. As a result, the likelihood of machine degradation caused by over-torqueing of the shafts, may be reduced. This enables high-strength objects to be reduced in the machine such as engine components and/or other large metal items. However, the machine may reduce a variety of materials including but not limited to polymeric materials, forestry products, etc., as previously discussed. The controller in the drive assembly 126 may be configured to carry out a variety of suitable control methods.

An axis system 150 is shown in FIG. 1 as well as FIGS. 2-6 and 8-10 to establish a common frame of reference. In one example, the y-axis may be parallel to a gravitational axis, the z-axis may be a lateral axis, and the x-axis may be a longitudinal axis. Thus, in one example, the y-axis may be a vertical axis. However, other orientations of the axes may be used, in other examples.

Figure 2:
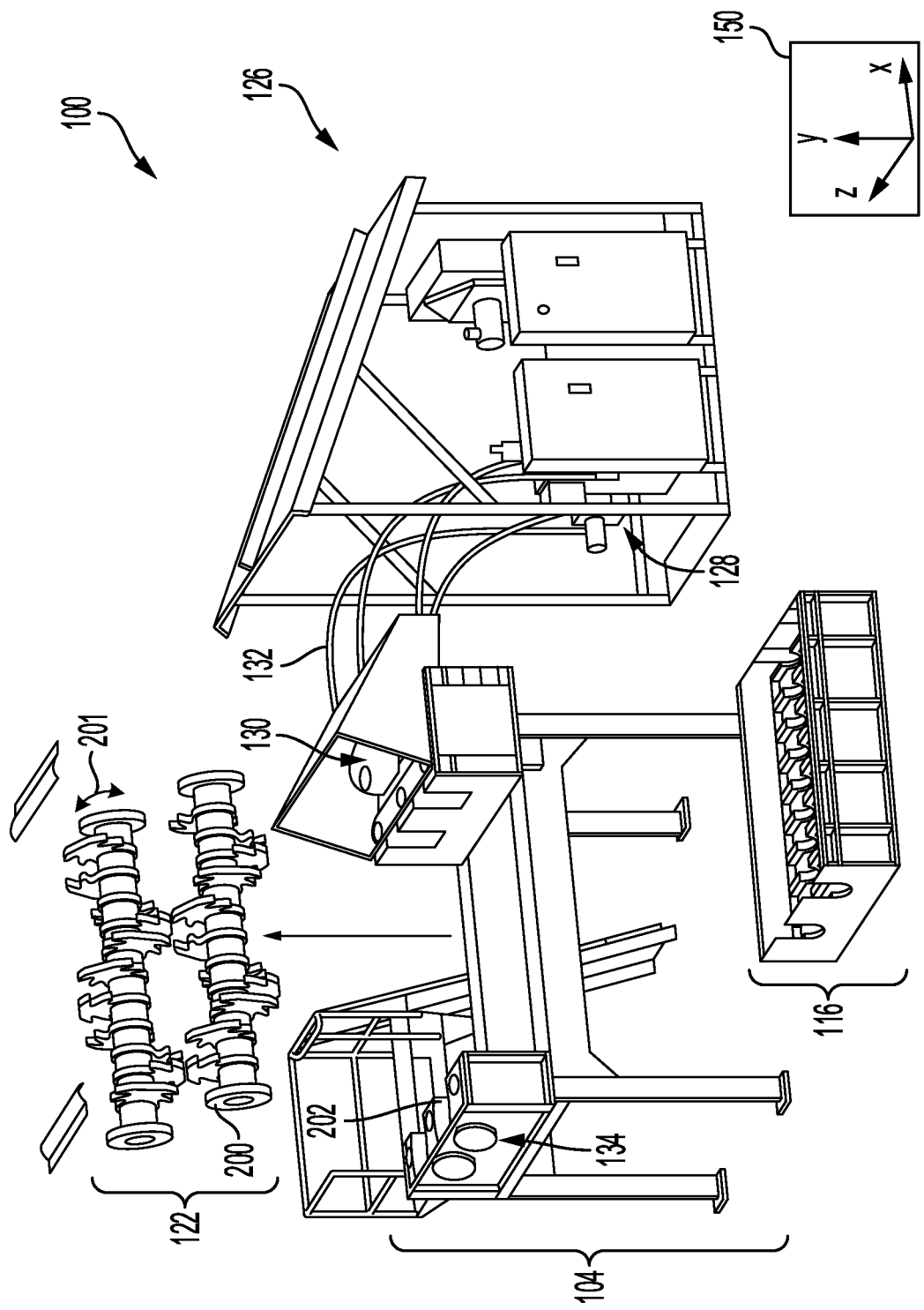
FIG. 2 shows disassembled view of the modular industrial reducing machine, shown in FIG. 1.

FIG. 2 shows the modular industrial reducing machine 100 in a disassembled state, subsequent to removal of the rotational shafts 122 and the cutting tray 116 from the base frame 104. As shown, the cutting tray 116 and the shafts 122 are moved away from the base frame 104 to allow for repair, replacement, etc., of the tray. Winches, pulleys, lifts, and/or other suitable devices may be used to remove the cutting tray and/or shafts from the base frame, for instance. The rotational shafts 122 include flanges 200 designed to attach to flanges 202 in the bearings 134. Consequently, the shafts may be quickly decoupled from the bearings. However, other attachment interfaces between the shafts and bearings may be used, in other examples. For instance, the shafts and bearings may include splines contoured to mate with one another.

In one example, the drive assembly 126 may be designed to rotate the shafts 122 in opposing rotational directions 201, depending on machine operating conditions. For instance, the shaft's rotational direction may be reversed when, for example, the motor torque exceeds a threshold value. Thus, in one use-case example, the machine's control strategy can be adjusted when material in the reduction chamber binds the cutters on the shafts. However, additional or alternate operating conditions may be used to trigger reversal of shaft rotation. For instance, motor temperature, motor speed, user input, etc., may be taken into account when determining the shaft's rotational direction. Further, in one example, the direction of shaft rotation may be controlled independently. In another example, the direction of shaft rotation may be controlled in tandem. In yet other embodiments, the drive assembly 126 may be designed to rotate the drive shafts in one rotational direction.

Various components in the drive assembly 126, such as the bearings 134, hydraulic conduits 132, the hydraulic motors 130, and/or the prime mover 128 may remain in place with regard to the base frame 104 while the cutting tray 116 and the shafts 122 are extracted from the machine. As a result, the shafts and tray may be quickly and efficiently decoupled and removed from the frame. However, deconstruction procedures where the bearings 134, hydraulic conduits 132, etc., are decoupled from the drive assembly 126 while the shafts and tray is removed have been contemplated.

Figure 3:
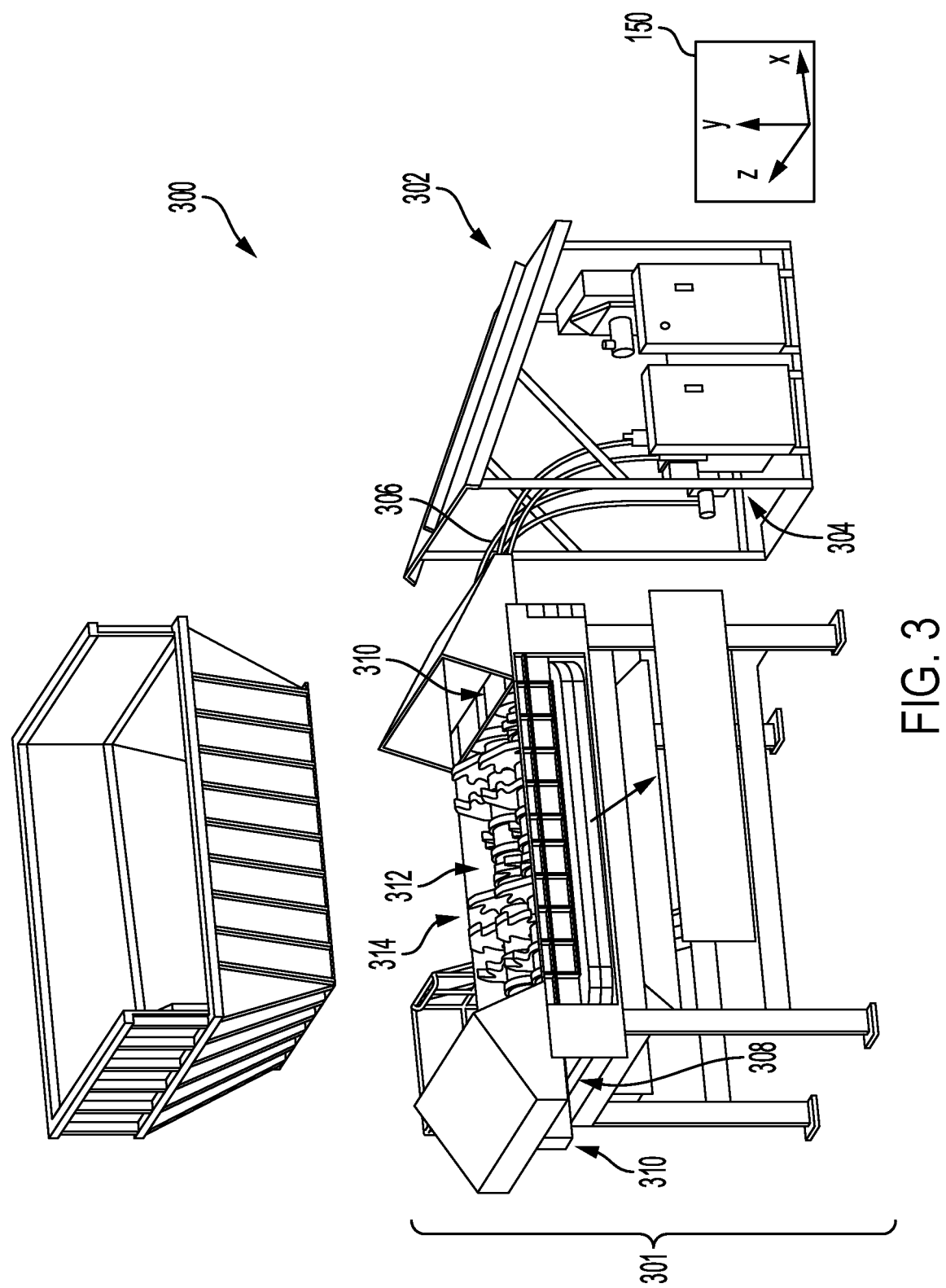
FIG. 3 shows a partially disassembled view of a second example of a modular industrial reducing machine.

FIG. 3 shows a modular industrial reducing machine 300 with a base frame 301 and a drive assembly 302 having an alternate configuration than the modular industrial reducing machine 100, shown in FIGS. 1-2. The drive assembly 302 again includes a prime mover 304, hydraulic conduits 306, bearings 308, hydraulic motors 310, etc., designed to impart rotational energy to shafts 312. In turn, the shafts 312 interact with a removable cutting tray 314 to reduce materials fed through the interface between the shaft cutters and removable cutting frame. Thus, the reducing machine 300, shown in FIG. 3, includes components, features, etc., similar to the reducing machine 100, shown in FIGS. 1-2. Therefore, redundant description of the common features, components, etc., is omitted for brevity. As shown in FIG. 3, the modular industrial reducing machine 300 includes hydraulic motors 310 positioned at each axial end of the shafts 312. As such, the machine includes four hydraulic motors 310 allowing additional torque to be imparted to the shafts 312 when compared to the reducing machine 100 shown in FIGS. 1-2. However, machine designs with alternate numbers of hydraulic motors may be used, in other examples.

Figure 4:
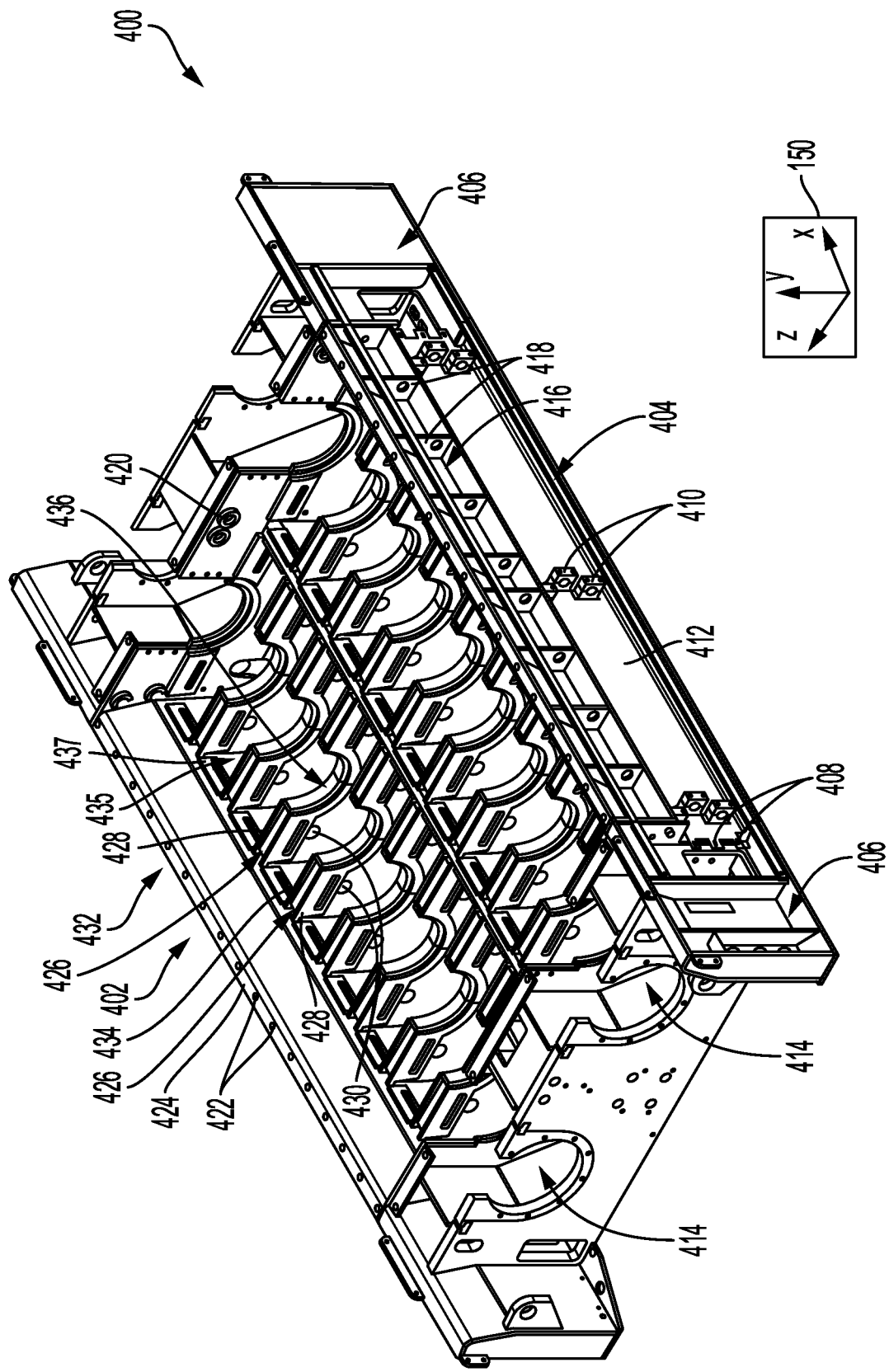
FIG. 4 shows an example of a cutting tray and base frame in a modular industrial reducing machine.

FIG. 4 shows a detailed view of an embodiment of a base frame 400 and a removable cutting tray 402 that may be included in a modular industrial reducing machine. As such, the base frame 400 and the removable cutting tray 402 may be examples, of the base frame 104 and the removable cutting tray 116, shown in FIGS. 1 and 2, or the base frame 301 and the cutting tray 314, shown in FIG. 3, for instance. More generally, features (e.g., structural or functional features) described in the various reducing machine embodiments described herein, may be combined with features of other machine embodiments described herein to form other distinct embodiments.

The removable cutting tray 402 includes sidewalls 404 and axial endwalls 406. The sidewalls 404 are coupled to the axial endwalls 406. Specifically, attachment apparatuses (e.g., bolts, screws, rivets, etc.) may extend (e.g., laterally extend) through openings 408, in the endwalls and sidewalls, to achieve the attachment between the endwalls and sidewalls. The sidewalls 404 are shown axially extending between the axial endwalls 406 thereby forming an enclosure for the removable cutting tray 402. In this way, the cutting tray 402 may be enclosed and supported by the base frame 400.

Hydraulic conduit clamps 410 are shown positioned on external surfaces 412 of the sidewalls 404. The hydraulic conduit clamps 410 are designed to guide hydraulic conduits along a periphery of the base frame 400. Hydraulic conduits may be routed in this manner when the drive assembly in the reducing machine includes hydraulic motors. However, the hydraulic conduits may be routed along other sections of the base frame, in other instances.

Bearing recesses 414 designed to support bearings are included in the axial endwalls 406. The bearing recesses 414 therefore act as carriages supporting and interfacing with the bearings. For instance, bearing races may be seated in the recesses.

The sidewalls 404 of the base frame 400 are shown positioned below upper side sections 416 of the removable cutting tray 402. However, other arrangements of the sidewalls and the cutting tray have been envisioned. For instance, the sidewalls may at least partially vertically extend up the sides of the cutting tray.

The upper side sections 416 of the cutting tray 402 include reinforcement ribs 418 configured to increase the structural integrity of the tray. The ribs 418 include two opposing planar sides and extend vertically in the depicted embodiment. However, other rib contours may be used, in other embodiments. Still further, in other embodiments, the ribs may be omitted from the cutting tray depending on the structural integrity targets of the machine.

The removable cutting tray 402 may be coupled to the axial endwalls 406 of the base frame 400 via bolts or other suitable attachment apparatuses (e.g., clamps, pins, and the like) extending (e.g., longitudinally extending) through openings 420 in the cutting tray and the axial endwalls. To elaborate, in one use-case example, the removable attachment may be achieved via nuts threading onto threaded sections of bolts which may include a head configured to interface with a tool (e.g., wrench, driver, etc.). In this way, the cutting tray may be easily attached and detached from the base frame to function as a modular component of the machine. The openings and attachment apparatuses may be axially arranged with regard to rotational axes of the shafts in the machine. Other arrangements of the attachment apparatuses have been contemplated.

The removable cutting tray 402 also includes openings 422 extending through a top surface 424 of the cutting tray. The openings 422 allow a hopper, such as the hopper 102 shown in FIG. 1, to be removably attached to the removable cutting tray. Therefore, bolts or other attachment devices may extend through aligned openings in the hopper and the cutting tray to form the connection between the tray and hopper. The openings 422 are vertically aligned, in the illustrated example. In this way, the hopper may also be designed with modular functionality. However, other opening orientations have also been contemplated.

The removable cutting tray 402 is shown including cross-members 426 extending laterally across the tray. Anvils 428 may be welded or otherwise fixedly coupled to the cross-members 426. Thus, the cross-members 426 structurally support the anvils 428. The welds between the anvils 428 and the cross-members 426 are indicated at 430. Thus, the welded interface may include a metal bead fusing the corresponding components together. As described herein, a welded interface forms a non-removable joint. Welding the anvils to the cross members increasing the tray's structural integrity when compared to anvils removably attached to the cross members. In other examples, the anvils 428 may be attached to the cross-members 426 using other suitable techniques or may be integrally cast, machined, etc., with the cross-members. The removable cutting tray 402 and its constituents may remain substantially stationary during reduction operation. As such, the anvils 428 may be referred to as non-rotating anvils.

The removable cutting tray 402 includes a tray housing 432 coupled to the cross-members 426. The tray housing 432 may be cast, welded, machined, or otherwise non-removably attached to the cross-members 426 to allow the structural integrity of the tray to be increased. In other examples, the tray housing 432 may be removably coupled to the cross-members 426. The tray housing 432 extends longitudinally between the axial endwalls 406 and laterally between the sidewalls 404 to form an enclosure. However, other tray housing profiles have been envisioned. In one example, the tray housing 432, the cross-members 426, and the anvils 428 may all be welded to one another to increase the tray's structural integrity. Only a portion of the tray's parts may be welded to one another, in other examples. The tray welding scheme may be chosen based on factors such as the end-user's structural design targets, the machine's expected feed materials, etc.

Sequential anvils 428 and cross-members 426 are axially spaced apart to create openings 435. The openings 435 allow the cutters to rotate adjacent to the anvils 428 and cross-members 426. Anvil plates 437 are also shown extending down peripheral sides of the openings 435. The anvil plates 437 may also assist in material processing operation. Additionally, the anvil plates 437 may be welded to or otherwise fixedly attached to the tray housing 432. However, in other embodiments the anvil plates may be omitted from the cutting tray 402.

During operation of the machine, the anvils 428 interact with cutters on the rotational shafts, such as the shafts 122 shown in FIG. 1, to reduce the size of materials in the reducing chamber. To elaborate, the anvils 428 include edges 434 allowing for material shearing during reduction operation. The anvils 428 are also shown including curved recesses 436 that may promote reduction operation in the machine. However, other anvil and cross member designs may be used in other embodiments.

The cutters, tray, and anvils may conceptually be manufactured from one or more of a variety of suitable metals (e.g., steel, aluminum, titanium, combinations thereof, etc.) Nonetheless, in practice the blades or portions of the blades may be manufactured from steel due to end-use design objectives related to cost, size, strength, and weight. Other components in the machine such as the base frame 400 may also be constructed out of metal (e.g., steel, aluminum, titanium, combinations thereof, etc.) in some examples. Polymeric materials, composite materials, and the like may also be used to construct certain components in the reducing machine, such as components in the drive assembly, for instance.

Figure 5:
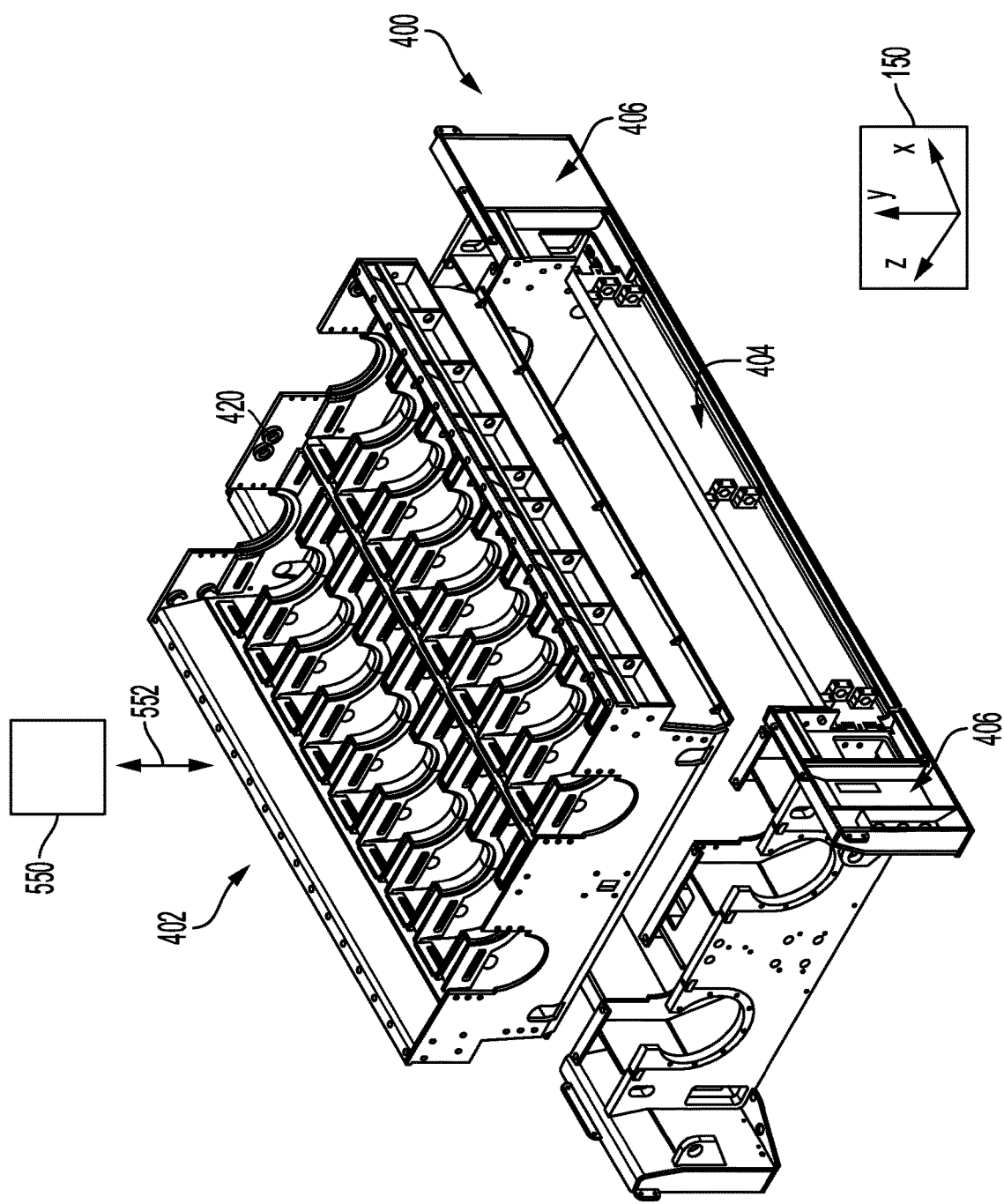
FIG. 5 shows a partially disassembled view of the cutting tray and base frame, shown in FIG. 4.
Figure 6:
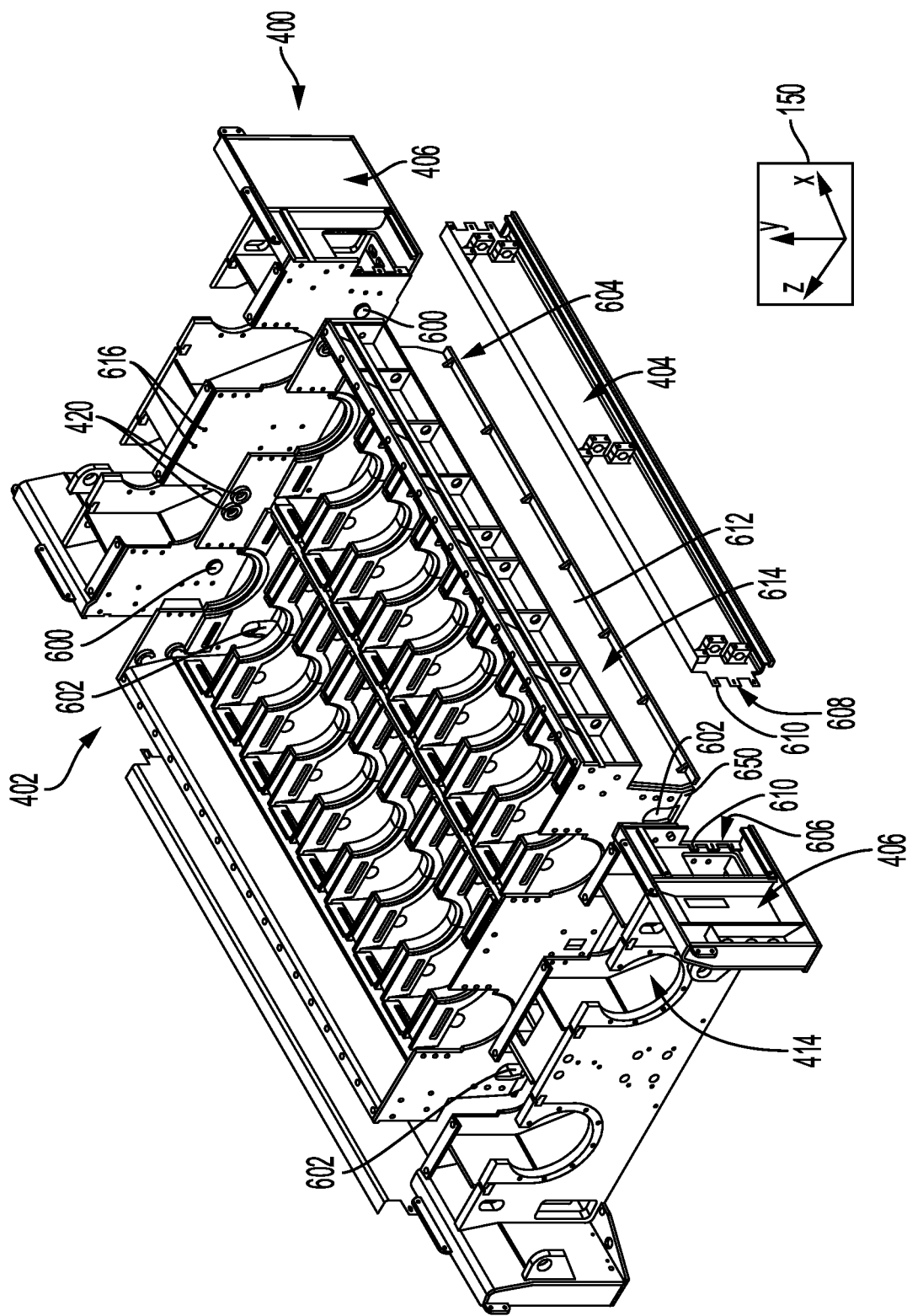
FIG. 6 shows a disassembled view of the cutting tray and base frame, shown in FIG. 4.

FIGS. 5-6 show the base frame 400 and removable cutting tray 402 in various stages of disassembly. Specifically, FIG. 5 shows the cutting tray 402 removed from the base frame 400. This type of tray removal may take place during disassembly. Prior to removal of the cutting tray 402, bolts or other attachment apparatuses coupling the axial endwalls 406 to the cutting tray 402 may be removed from the reducing machine.

As shown, the sidewalls 404 and the axial endwalls 406 of the base frame 400 remain connected during removal of the cutting tray 402. As such, the cutting tray 402 may be removed with limited clearance, in certain circumstances, thereby simplifying repair. As a result, the machine's downtime during repair is decreased. In other examples, however, the sidewalls 404 may be decoupled from the axial endwalls 406 during machine disassembly.

FIG. 5 also shows a component removal apparatus 550. The component removal apparatus 550 is designed to lift or otherwise extract the cutting tray 402 as well as the rotational shafts from the base frame 400. As such, the apparatus 550 may include winches (e.g., electric, hydraulic, pneumatic, or internal combustion driven device), lifts, cranes, mechanical brakes, ratchets, pawls, combinations thereof, etc., to enable safe and efficient component extraction. Arrow 552 indicates mechanical linkage (e.g., pulleys, cables, chains, wires, belts, arms, hooks, etc.) which may be used to attach the component removal apparatus to the cutting tray 402. The openings 420 in the axial endwalls 406 are also depicted in FIG. 5.

FIG. 6 shows the base frame 400 with the sidewalls 404 detached from the axial endwalls 406. FIG. 6 also shows bosses 600 in the axial endwalls 406 and slots 602 in the cutting tray 402. Specifically, bosses are included in both axial endwalls 406 of the base frame 400.

The bosses 600 and slots 602 function to guide the cutting tray 402 into desired alignment during machine assembly. Specifically, the cutting tray 402 may be guided into an alignment that allows the cutters in the rotational shafts, such as the shafts 122 shown in FIG. 1, to interact with the cutting tray to efficiently reduce materials but prevent the cutters from contacting the anvils during material processing. This alignment feature allows the machine's assembly operation to be streamlined to reduce installation time.

The rotational shafts may be positioned laterally between the boss and slot interfaces on one axial side of the frame when the machine is assembled. Additionally, the slots 602 extend downward to a bottom side 604 of the cutting tray 402. To elaborate, the tray housing 432 is shown including walls 650 angled axially inward toward the center of the cutting tray 402. The slots 602 are shown extending into the angled wall 650. The angled wall 650 may aid in slot and boss alignment during installation, re-installation, or replacement of the cutting tray. For instance, the bosses may be easily mated with the slots when the cutting tray is dropped vertically downward into the base frame. However, other boss and slot layouts, configurations, etc., have been contemplated. For instance, a boss and slot may, additionally or alternatively, be positioned laterally between the shafts, in one example, or the slots and bosses may be adjacent to an upper side of the tray, in other examples. However, positioning the bosses 600 and slots 602 laterally outboard in relation to bearing recesses 414 may allow for increased visibility during assembly and disassembly.

FIG. 6 also shows attachment flanges 606 in the axial endwalls 406 facilitating attachment with flanges 608 in the sidewalls 404. As shown, each of the flanges 606 and 608 include opening 610 allowing attachment apparatuses to extend therethrough, when the machine is assembled.

FIG. 6 also shows a lower section 612 in a lateral side 614 of the removable cutting tray 402. The lower section 612 is laterally interposed between the sidewalls 404 of the base frame 400, when the machine is assembled. The lower section 612 may increase the structural integrity of the cutting tray 402. However, other cutting tray profiles may be used, in other examples.

FIG. 6 also shows the plurality of openings 420 included in the removable cutting tray 402 and the plurality of openings 616 in the axial endwalls 406. When assembled, the openings 420 in the removable cutting tray 402 are aligned with the openings 616 in the axial endwalls 406 to allow attachment apparatuses to extend therethrough. In this way, the cutting tray is removably coupled to the axial endwalls, thereby expanding machine modularity. Thus, removable attachment between the endwalls and the cutting tray is enabled via this attachment scheme. The sizes of the openings 616 in the cutting tray 402 and the corresponding openings 420 in the axial endwalls 406 may be substantially equivalent to allow bolts of a constant diameter to be inserted therethrough. However, the diameters of the openings may vary, in other examples.

Figure 7:
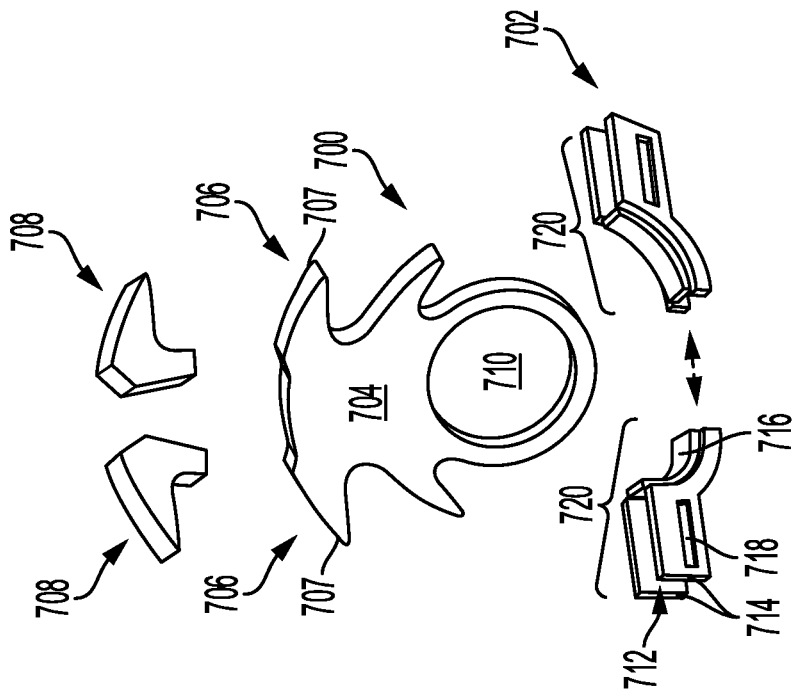
FIG. 7 shows a detailed view of an example of a cutter and an anvil.

FIG. 7 shows a detailed view of an example of a cutter 700 and an anvil 702. The cutter 700 and the anvil 702 may be included in any of the reducing machine embodiments described herein.

The cutter 700 includes a body 704 with cutting protrusions 706. The cutting protrusions 706 taper towards their distal ends 707 in the depicted example. In this way, cutting tips may be formed on the protrusions. However, other protrusion contours may be used, in other embodiments. Replacement cutting protrusions 708 may also be welded to the cutter 700 during a repair procedure. Thus, during repair operation, cutting protrusion may be removed from the body of the cutter and the replacement cutting protrusions may be welded to the body. In this way, the cutter may be efficiently repaired. However, in other examples, the entire cutter may be replaced during shaft repair. As previously discussed, during cutting operation the cutter 700 and the anvil 702 function to shear and/or otherwise reduce materials fed into the interface between the cutter and anvil. The cutter 700 also includes an opening 710 allowing the cutter to be coupled to a rotational shaft, such as one of the shafts 122, shown in FIG. 1. The cutter 700 may be welded to or integrally constructed with the shaft. In this way, a robust connection may be formed between the shaft and cutter, to reduce the likelihood of the cutter and shaft decoupling. However, in other examples, the cutter 700 may be press fit onto a shaft with a sleeve, for example.

Additionally, in another example, the cutter 700 and/or the anvil 702 may be hardfaced. Specifically, in one example, edges and/or tips of the cutter 700 and/or anvil 702 may be hardfaced. As described herein hardfacing is a technique where a tougher material is applied to a base metal in a component. Hardfacing may be accomplished via suitable welding methods including but not limited to arc welding, metal inert gas (MIG) welding, tungsten inert gas (TIG) welding, etc. Hardfacing the cutter and anvil extends the useful life of the parts.

The exemplary anvil 702 includes a gap 712 between side sections 714. The gap 712 may be contoured to mate with cross-members in the cutting tray. A curved wall 716 extends down from side sections 714 in the anvil 702. The curved wall 716 may allow for efficient cutting interaction between the shafts and the anvils. It will therefore be appreciated that the curvature of the curved wall 716 may correspond to the curvature of a shaft section adjacent to wall. However, numerous suitable anvil profiles have been contemplated. The anvil 702 is also shown including openings 718 in the side sections 714. The openings 718 may allow for the efficient welding of the cross-member to the anvil. Constructing the anvil 702 with the openings 718 also reduces the weight of the anvil. However, numerous suitable anvil contours have been envisioned.

The anvil 702 is also shown split into lateral sections 720 mirroring one another. The lateral sections 720 may be attached to each other prior to and/or during attachment of the anvil to the cross-member in the cutting tray. In other examples, however, anvils with a continuous shape may be used in the machine.

Figure 8:
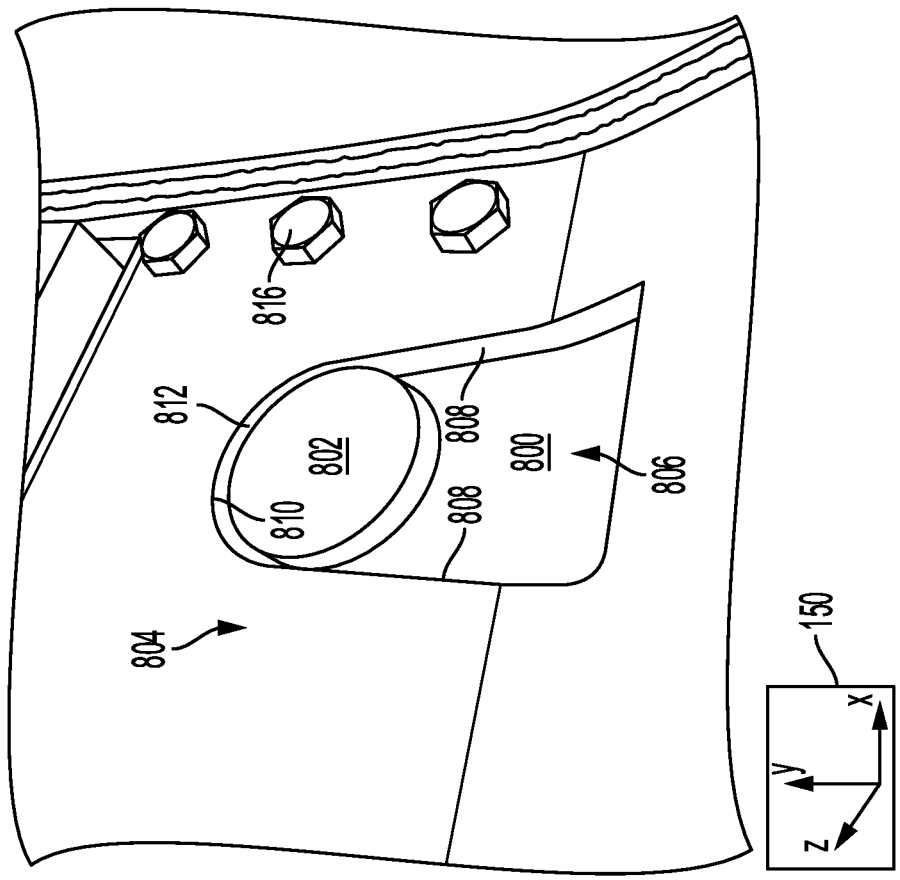
FIG. 8 shows a detailed view of a boss in a base frame mated with a slot in a cutting tray.

FIG. 8 shows a detailed view of a slot 800 of a removable cutting tray 804 mated with a boss 802 in an axial endwall 806 of a based frame. The slot 800 and boss 802 allow for quick and efficient alignment of the tray and base frame. As such, the cutting tray and base frame may be quickly assembled during installation as well as repair of the machine.

The slot 800 includes side surfaces 808 tapering in an upward direction and a curved upper surface 810 contoured to mate with a curved outer surface 812 of the boss 802. As such, the curved outer surface 812 of the boss 802 may be in face sharing contact with the curved upper surface 810 of the slot, when the boss and slot are coupled to one another. However, other slots contours may be used, in other examples. For instance, the side surfaces 808 may taper in a downward direction. The boss 802 has a cylindrical shape in the illustrated embodiment. However, other boss shapes have been contemplated, such as conical bosses, bosses with triangular cross-sections, etc. Bolts 816 attaching the axial endwall 806 to the removable cutting tray 804, are also shown in FIG. 8.

Figure 9:
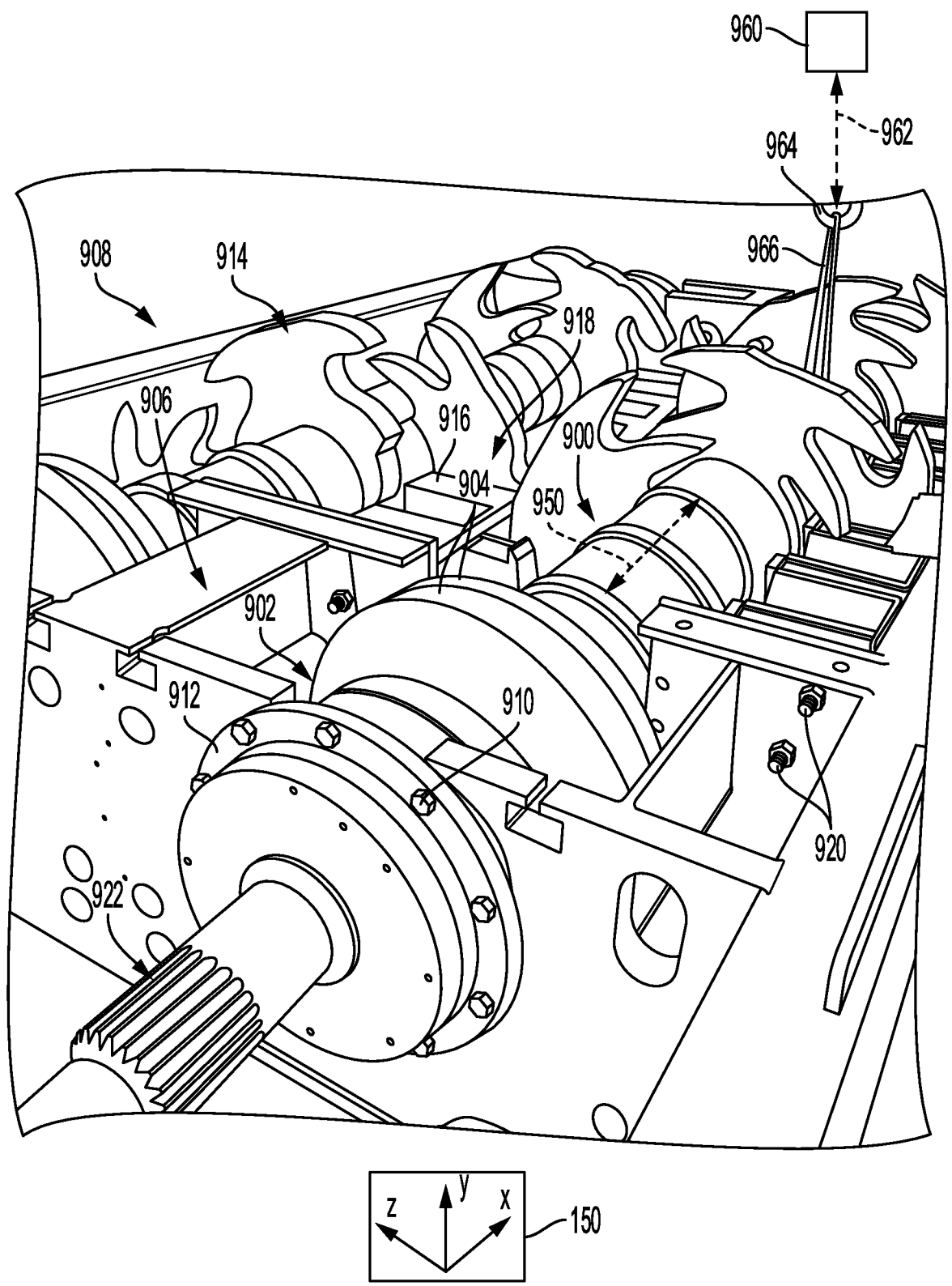
FIG. 9 shows an example of an interface between bearings, a base frame, and rotational shafts in a modular industrial reducing machine.

FIG. 9 shows a detailed illustration of an interface between a rotational shaft 900 and a bearing 902. Flanges 904 in the rotational shaft 900 and the bearing 902 facilitate the removable attachment between the components, in the illustrated example. The flanges 904 may be spaced apart by a desired axial distance using shims or other suitable spacers axially positioned therebetween. In this way, the axial position of the shaft 900 may be precisely controlled during installation to reduce the likelihood of misalignment between the cutters and the anvils. However, in other embodiments, splined or keyed interfaces may be additionally or alternatively used to attach the bearing 902 to the rotational shaft 900.

The bearing 902 is also shown attached to an axial endwall 906 of a base frame 908 via attachment apparatuses 910 extending through a flange 912 of the bearing. The bearing 902 may remain coupled to the axial endwall 906 during removal of the shaft 900, resulting in simplified machine disassembly.

The rotational shaft 900 is shown including cutters 914. The cutters 914 interact with anvils 916 in the cutting tray 918 to process materials fed therethrough, as previously discussed. Attachment apparatuses 920 are shown coupling the axial endwall 906 to the removable cutting tray 918. The attachment apparatuses 920 are axially aligned, in the illustrated example. However, other bolt alignments may be used, in other examples. As described herein, axial alignment indicates a parallel alignment between a central axis of a component and the axis of rotation 950 of the shaft 900. A splined shaft 922 is also shown extending from the bearing 902. The splined shaft 922 may allow the drive shaft to be connected to a hydraulic motor. However, other suitable structures for coupling the bearing to the hydraulic motor may be used, in other embodiments.

FIG. 9 also shows a component removal apparatus 960 designed to lift or otherwise extract the cutting tray 918 as well as the rotational shaft 900 from the base frame 908. Arrow 962 depicts the mechanical extension and retraction functionality between the apparatus 960 and the hook 964 as well as a cable 966. As such, the apparatus 960 may lift the tray 918 and/or shafts 900 from the base frame 908 or vice versa.

Figure 10:
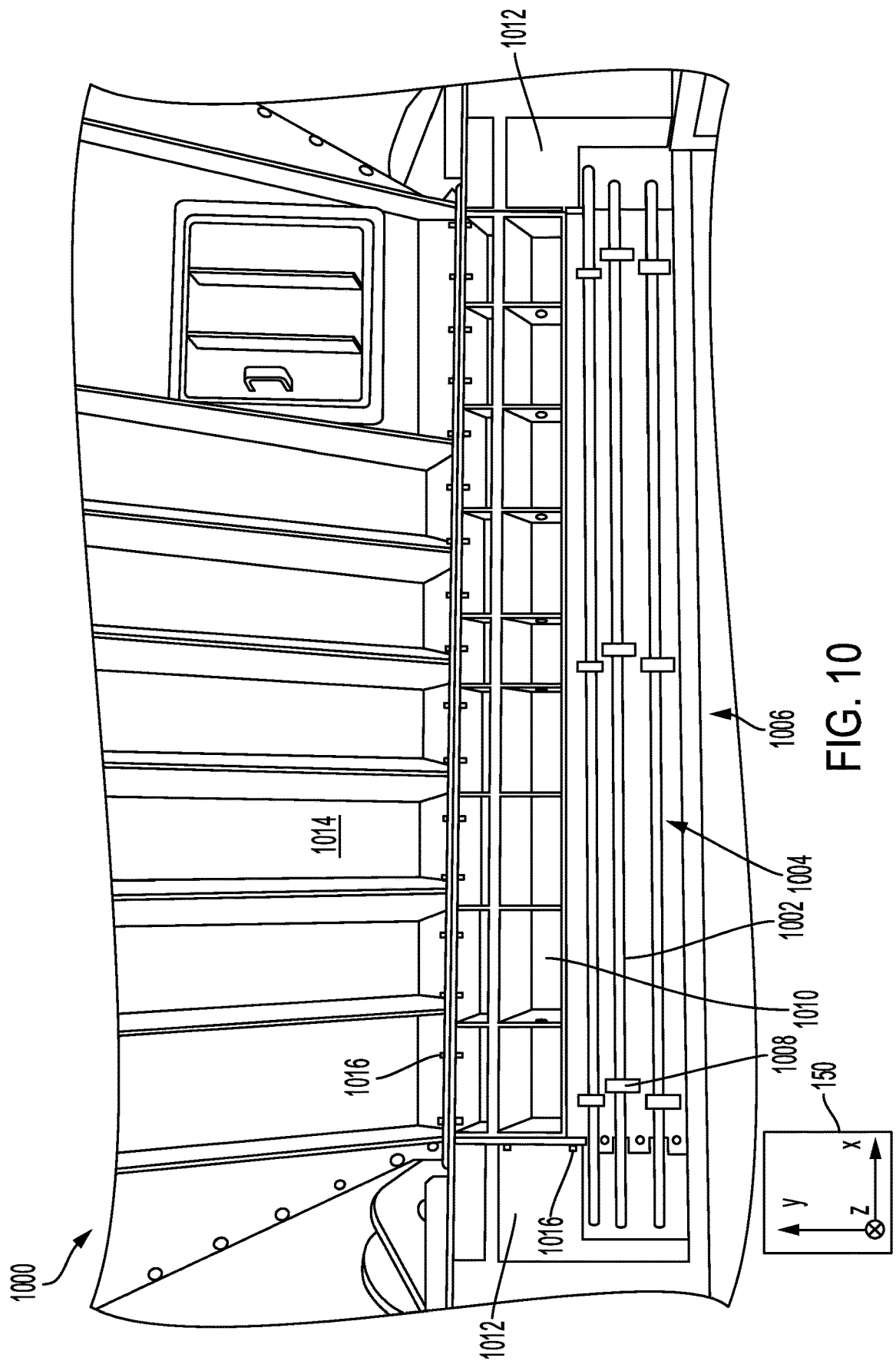
FIG. 10 shows a side view of another example of a modular industrial reducing machine.

FIG. 10 shows a detailed side view of another example of an industrial cutting machine 1000. Hydraulic conduits 1002 are shown extending along sidewalls 1004 of a base frame 1006. Conduit clamps 1008 attached to the hydraulic conduits 1002 allow the hydraulic conduits to be routed in desired location along the base frame 1006. The conduit clamps 1008 at least partially circumferentially surround the hydraulic conduits 1002 to retain the conduits and route them along a desired path.

FIG. 10 also shows a cutting tray 1010 removably coupled to axial endwalls 1012 and a hopper 1014. As shown, attachment apparatuses 1016 are used to accomplish said removable coupling between the cutting tray 1010 and the axial endwalls 1012 and the hopper 1014. The hydraulic conduits 1002 are routed vertically below the cutting tray 1010, in the depicted example, to reduce the likelihood of unwanted interaction between the conduits and the tray during tray removal. However, the conduits may be routed along other suitable paths, in other examples.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Additionally, an element offset from another element may be referred to as such. It will be appreciated that one or more components referred to as being "substantially, similar, and/or identical" differ from one another according to manufacturing tolerances (e.g., within 1-5% deviation). Furthermore, as describe herein "approximately" refers to a deviation by 5% or less, unless otherwise noted.

Figure 11:
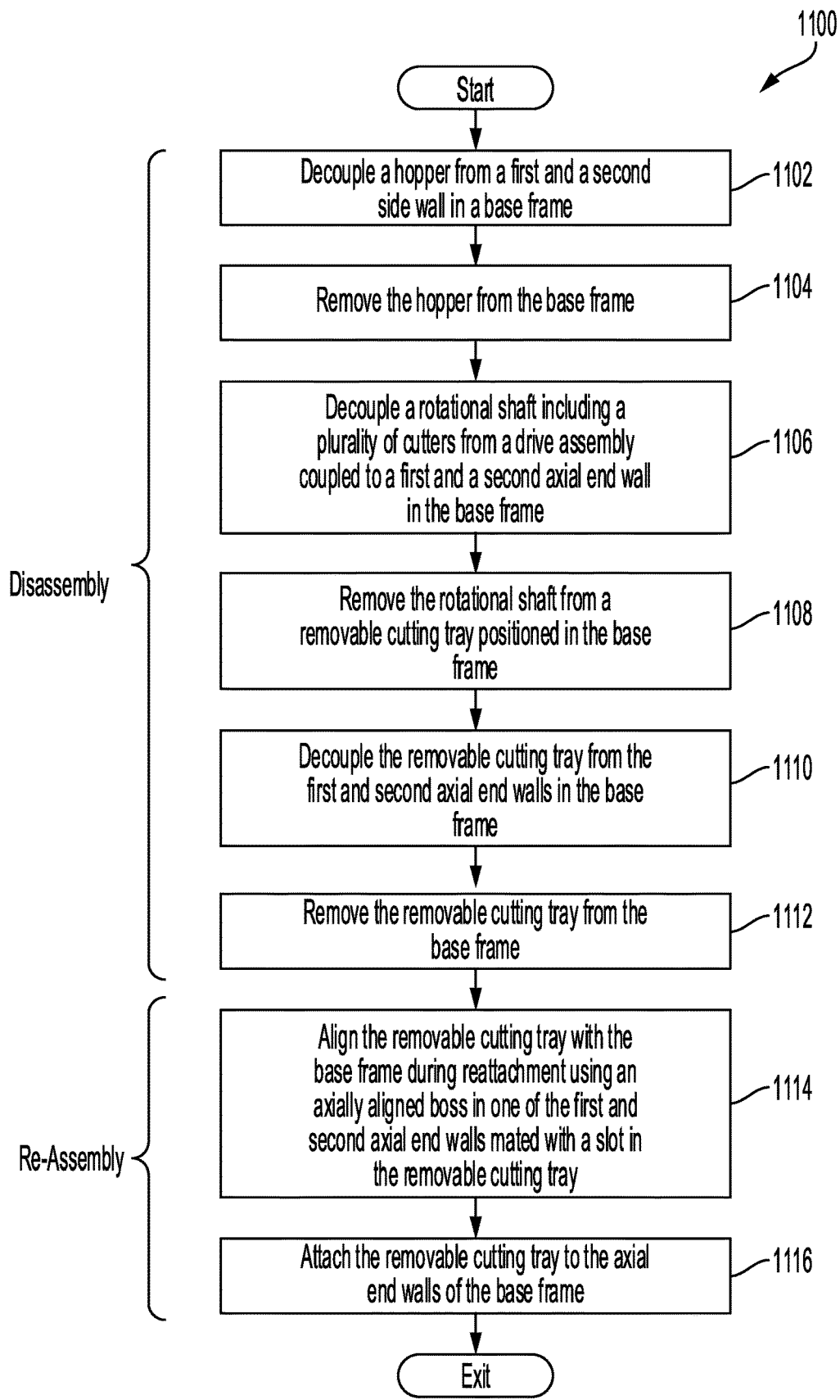
FIG. 11 shows a disassembly and reassembly method for a modular industrial reducing machine.

FIG. 11 shows a method 1100 for disassembly and reassembly of a modular industrial reducing machine. In particular, steps 1102-1112 indicate a disassembly scheme while steps 1114-1116 indicate a reassembly scheme. The method 1100 may be used to disassemble and reassemble the modular industrial reducing machines described above with regard to FIGS. 1-10. However, in other examples, the method may be used to disassemble and reassemble other suitable modular industrial reducing machines. Furthermore, the method steps may be at least partially implemented via personnel using mechanisms such as tooling devices, lifts, pulleys, and the like to aid in the disassembly/reassembly procedure.

At 1102, the method includes decoupling a hopper from a first and a second sidewall in a base frame. For instance, attachment apparatuses such as bolts attaching the sidewalls and hopper may be decoupled from the walls and hopper.

At 1104, the method includes removing the hopper from the base frame. For instance, the hopper may be lifted from the frame via cranes, pulleys, lifts, and/or other suitable mechanisms.

At 1106, the method includes decoupling a rotational shaft including a plurality of cutters from a drive assembly coupled to a first and a second axial endwall in the base frame. For instance, flanges on the bearings and drive shafts coupled via bolts or other suitable attachment apparatuses may be decoupled from one another.

At 1108, the method includes removing the rotational shaft from a removable cutting tray positioned in the base frame. The rotational shafts may be lifted from the cutting tray via cranes, pulleys, hydraulic lifts, and the like, for instance.

At 1110, the method includes decoupling the removable cutting tray from the first and second axial endwalls in the base frame. For example, attachment devices (e.g., axially aligned bolts) may be decoupled from the endwalls and the cutting tray.

At 1112, the method includes removing the removable cutting tray from the base frame. Again, the cutting tray may be lifted from the base frame via pulleys or other suitable mechanisms designed to extract (e.g., vertically extract) the tray from the frame.

At 1114, the method includes aligning the removable cutting tray with the base frame during reattachment using an axially aligned boss in one of the first and second axial endwalls mated with a slot in the removable cutting tray. The slot functions to guide the boss into desired alignment to reduce the likelihood of tray misalignment during reassembly.

At 1116, the method includes attaching the removable cutting tray to the axial endwalls of the base frame. For instance, the tray may be bolted to the endwalls.

Method 1100 allows the modular industrial reducing machine to be efficiently disassembled and subsequently reassembled. As a result, the downtime for machine repair is substantially decreased, allowing the machine's overall throughput and therefore profitability to be increased.

The technical effect of the method for assembly and disassembly of the modular reducing machine is to increase assembly and disassembly efficiency and allow the machine to be rapidly repaired and/or reconfigured.

The invention will be further described in the following paragraphs. In one aspect, a modular industrial reducing machine is provided that comprises a hopper designed to guide material into a reducing compartment; a base frame removably coupled to the hopper and including a first and a second sidewall and first and second axial endwalls; a drive assembly coupled to the first and second axial endwalls and a rotational shaft with a plurality of cutters; and a removable cutting tray releasably coupled to the first and second axial endwalls and including a plurality of non-rotating anvils designed to interact with the plurality of cutters during reducing operation to reduce material in the reducing compartment.

In another aspect, a method for disassembling a modular industrial reducing machine, is provided that comprises decoupling a removable cutting tray from first and second axial endwalls in a base frame; and removing the removable cutting tray from the base frame; where during removal of the removable cutting tray from the base frame, a plurality of bearings, a hydraulic motor, and/or a hydraulic conduit in a drive assembly remain in a substantially fixed position with regard to the base frame. The method may further comprise in one example, prior to decoupling the removable cutting tray from the first and second axial endwalls: decoupling a hopper from a first and a second sidewall in the base frame; removing the hopper from the base frame; decoupling a rotational shaft including a plurality of cutters from the drive assembly coupled to the first and second axial endwalls in the base frame; and removing the rotational shaft from a removable cutting tray positioned in the base frame. In another example, the method may further comprise, subsequent to removing the removable cutting tray from the base frame, aligning the removable cutting tray with the base frame during reattachment using an axially aligned boss in one of the first and second axial endwalls mated with a slot in the removable cutting tray.

In yet another aspect, a modular industrial reducing machine is provided that comprises a hopper designed to guide material into a reducing compartment; a base frame removably coupled to the hopper and including a first and second sidewall and first and second axial endwalls; a drive assembly coupled to the first and second axial endwalls and a rotational shaft with a plurality of cutters; and a removable cutting tray releasably coupled to the first and second axial endwalls and including a plurality of non-rotating anvils; where the plurality of non-rotating anvils are welded to cross-members laterally extending across and non-removably coupled to a tray housing.

In any of the aspects or combinations of the aspects, at least one of the first and second axial endwalls may include at least one axially aligned boss mated with a slot in the removable cutting tray.

In any of the aspects or combinations of the aspects, where the slot may taper in a vertical direction.

In any of the aspects or combinations of the aspects, the first and second axial endwalls may be removably coupled to the removable cutting tray via a plurality of axially aligned attachment apparatuses.

In any of the aspects or combinations of the aspects, the plurality of non-rotating anvils may be coupled to a plurality of cross-members extending laterally across the removable cutting tray.

In any of the aspects or combinations of the aspects, the plurality of non-rotating anvils may be welded to the plurality of cross-members and the plurality of cross-members and a tray housing may be non-removably attached to one another.

In any of the aspects or combinations of the aspects, the drive assembly may include a prime mover designed to deliver pressurized hydraulic fluid to a hydraulic motor via one or more hydraulic conduits, where the hydraulic motor may be designed to rotate the rotational shaft during reducing operation, where the hydraulic motor may be coupled to one of the first and second axial endwalls, and where a position of the one or more hydraulic conduits and/or the hydraulic motor may remain substantially fixed with regard to the base frame during removal of the removable cutting tray from the base frame.

In any of the aspects or combinations of the aspects, the hydraulic motor may be designed to rotate the rotational shaft in a first rotational direction and a second rotational direction opposing the first rotational direction.

In any of the aspects or combinations of the aspects, the drive assembly may include a prime mover designed to deliver pressurized hydraulic fluid to a hydraulic motor designed to rotate the rotational shaft during reducing operation and where a relative position of the hydraulic motor with regard to the base frame remains substantially fixed when the removable cutting tray is decoupled from one or more of the first and second axial endwalls.

In any of the aspects or combinations of the aspects, the drive assembly may include a plurality of bearings positioned in the first and second axial endwalls and where a relative position of the plurality of bearings with regard to the first and second axial endwalls remains substantially fixed when the removable cutting tray is decoupled from one or more of the first and second axial endwalls.

In any of the aspects or combinations of the aspects, the first and second axial endwalls may be removably coupled to the removable cutting tray via a plurality of axially aligned attachment apparatuses.

In any of the aspects or combinations of the aspects, at least one of the first and second axial endwalls may include at least one axially aligned boss mated with a slot in the removable cutting tray.

In any of the aspects or combinations of the aspects, the slot may taper in a vertical direction.

In any of the aspects or combinations of the aspects, the plurality of cutters and/or the plurality of non-rotating anvils may be hardfaced.

In any of the aspects or combinations of the aspects, the rotational shaft may include a flange removably attached to a bearing in the drive assembly.

Note that the example control routines described herein can be used with various industrial machine configurations. The control methods, routines, strategies, etc., disclosed herein may be stored as executable instructions in non-transitory memory and may be carried out by the control system including the controller in combination with the various sensors, actuators, and other hardware. The specific routines described herein may represent one or more of any type of processing strategies. As such, various actions, operations, and/or functions illustrated may be performed in the sequence illustrated, in parallel, or may be omitted, in some cases. Likewise, the processing order may not necessarily be required to achieve the features and advantages of the example embodiments described herein, but is provided for ease of illustration and description. One or more of the illustrated operations, actions, and/or functions may be repeated depending on the type of strategy being used. Further, the described actions, operations, and/or functions may graphically represent code to be programmed into non-transitory memory of computer readable storage medium in a control system, where the described actions are carried out by executing the instructions in a system including the various hardware components in combination with the electronic controller.

The configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Those skilled in the art will recognize that it is common within the art to describe devices and/or processes in the fashion set forth herein, and thereafter use standard engineering practices to integrate such described devices and/or processes into larger systems.

Embodiments of methods and systems for creating, assembling, and disassembling modular industrial reducing machines have been described. The following claims are directed to said embodiments, but do not preempt creating modular industrial reducing machines in the abstract. Those having skill in the art will recognize numerous other approaches to creating and re-honing modular industrial reducing machines, precluding any possibility of preemption in the abstract. The terms used in the appended claims are defined herein, with the proviso that the claim terms may be used in a different manner if so defined by express recitation.

The invention claimed is:

1. A modular industrial reducing machine, comprising:
a hopper designed to guide material into a reducing compartment;
a base frame removably coupled to the hopper and including a first and a second sidewall and first and second axial endwall, wherein the first and second sidewalls and the first and second axial endwalls form an enclosure;
a drive assembly coupled to the first and second axial endwalls and a rotational shaft with a plurality of cutters; and
a removable cutting tray releasably coupled to the first and second axial endwalls and located within the enclosure, the removable cutting tray including a plurality of non-rotating anvils designed to interact with the plurality of cutters during reducing operation to reduce material in the reducing compartment, and a plurality of reinforcement ribs on exterior walls of the cutting tray, wherein the exterior walls of the cutting tray are parallel to the first and second sidewalls of the base frame, and wherein at least one of the first and second axial endwalls includes at least one axially aligned boss mated with a slot in a removable cutting tray;
where the first and second axial endwalls are removably coupled to the removable cutting tray via a plurality of axially aligned attachment apparatuses laterally extending through openings in at least one of the first and second axial endwalls and the first and second sidewalls.

2. The modular industrial reducing machine of claim 1, where the slot tapers in a vertical direction.

3. The modular industrial reducing machine of claim 1, where the plurality of non-rotating anvils are coupled to a plurality of cross-members extending laterally across the removable cutting tray.

4. The modular industrial reducing machine of claim 3, where the plurality of non-rotating anvils are welded to the plurality of cross-members and the plurality of cross-members and a tray housing are non-removably attached to one another.

5. The modular industrial reducing machine of claim 1, where the drive assembly includes a prime mover designed to deliver pressurized hydraulic fluid to a hydraulic motor via one or more hydraulic conduits, where the hydraulic motor is designed to rotate the rotational shaft during reducing operation, where the hydraulic motor is coupled to one of the first and second axial endwalls, and where a position of the one or more hydraulic conduits and/or the hydraulic motor remains substantially fixed with regard to the base frame during removal of the removable cutting tray from the base frame.

6. The modular industrial reducing machine of claim 5, where the hydraulic motor is designed to rotate the rotational shaft in a first rotational direction and a second rotational direction opposing the first rotational direction.

7. The modular industrial reducing machine of claim 1, where the rotational shaft includes a flange removably attached to a bearing in the drive assembly.

8. A method for disassembling a modular industrial reducing machine, comprising:
decoupling an attachment apparatus connecting a removable cutting tray and a base frame;
decoupling a first slot and a second slot on opposing exterior sides of the removable cutting tray from a first axially aligned boss on an interior side of the base frame and facing the removable cutting tray of a first axial endwall and a second axially aligned boss on an interior side of the base frame and facing the removable cutting tray of a second axial endwall in the base frame; and
removing the removable cutting tray from within the base frame formed by the first and second axial endwalls and a first and a second sidewall;
where during removal of the removable cutting tray from within the base frame, a plurality of bearings, a hydraulic motor, and/or a hydraulic conduit in a drive assembly remain in a substantially fixed position with regard to the base frame.

9. The method of claim 8, further comprising, prior to decoupling the removable cutting tray from the first and second axial endwalls:

decoupling a hopper from the first and a second sidewall in the base frame;

removing the hopper from the base frame;

decoupling a rotational shaft including a plurality of cutters from the drive assembly coupled to the first and second axial endwalls in the base frame; and removing the rotational shaft from the removable cutting tray positioned in the base frame.

10. The method of claim 8, further comprising, subsequent to removing the removable cutting tray from the base frame, aligning the removable cutting tray with the base frame during reattachment using the axially aligned boss in one of the first and second axial endwalls mated with a slot of the first slot and the second slot in the removable cutting tray and fastening the cutting tray to the base frame using the attachment apparatus, wherein there is at least one attachment apparatus.

11. A modular industrial reducing machine, comprising:
a hopper designed to guide material into a reducing compartment;
a base frame removably coupled to the hopper and including a first and second sidewall and first and second axial endwalls forming an enclosure;
a drive assembly coupled to the first and second axial endwalls and a rotational shaft with a plurality of cutters; and
a removable cutting tray releasably coupled to the first and second axial endwalls and including a plurality of non-rotating anvils, wherein each anvil has an opening in a respective side wall, wherein the removable cutting tray is located within the enclosure, at least one of the first and second axial endwalls including at least one axially aligned boss mated with a slot in the removable cutting tray, the first and second axial endwalls configured to be removably coupled to the removable cutting tray via a plurality of axially aligned attachment apparatuses laterally extending through openings in at least one of the first and second axial endwalls and the first and second sidewalls; and
where the plurality of non-rotating anvils are welded to cross-members laterally extending across and non-removably coupled to a tray housing.

12. The modular industrial reducing machine of claim 11, where the drive assembly includes a prime mover designed to deliver pressurized hydraulic fluid to a hydraulic motor designed to rotate the rotational shaft during reducing operation and where a relative position of the hydraulic motor with regard to the base frame remains substantially fixed when the removable cutting tray is decoupled from one or more of the first and second axial endwalls.

13. The modular industrial reducing machine of claim 11, where the drive assembly includes a plurality of bearings positioned in the first and second axial endwalls and where a relative position of the plurality of bearings with regard to the first and second axial endwalls remains substantially fixed when the removable cutting tray is decoupled from one or more of the first and second axial endwalls.

14. The modular industrial reducing machine of claim 11, where the slot tapers in a vertical direction.

15. The modular industrial reducing machine of claim 11, where the plurality of cutters and/or the plurality of non-rotating anvils are hardfaced.

16. The modular industrial reducing machine of claim 11, where the rotational shaft includes a flange removably attached to a bearing in the drive assembly.

* * * * *